US010415969B2

(12) United States Patent
Sudo et al.

(10) Patent No.: US 10,415,969 B2
(45) Date of Patent: Sep. 17, 2019

(54) DETECTION DEVICE, PHYSICAL QUANTITY MEASURING DEVICE, DETECTION SYSTEM, ELECTRONIC DEVICE, AND VEHICLE

(71) Applicant: Seiko Epson Corporation, Tokyo (JP)

(72) Inventors: Yasuhiro Sudo, Chino (JP); Katsuhiko Maki, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/924,999

(22) Filed: Mar. 19, 2018

(65) Prior Publication Data
US 2018/0274925 A1 Sep. 27, 2018

(30) Foreign Application Priority Data
Mar. 27, 2017 (JP) ................................. 2017-060780

(51) Int. Cl.
| | |
|---|---|
| G01C 19/5776 | (2012.01) |
| B60W 40/10 | (2012.01) |
| G01P 15/097 | (2006.01) |
| G01D 21/02 | (2006.01) |
| G08C 15/00 | (2006.01) |
| G01P 15/00 | (2006.01) |

(52) U.S. Cl.
CPC ......... G01C 19/5776 (2013.01); B60W 40/10 (2013.01); G01D 21/02 (2013.01); G01P 15/097 (2013.01); G08C 15/00 (2013.01); *B60W 2420/10* (2013.01); *G01P 15/00* (2013.01)

(58) Field of Classification Search
CPC ... G01C 19/5776; B60W 40/10; G01D 21/02; G01P 15/097; G08C 15/00
USPC ........................................................ 340/935
See application file for complete search history.

(56) References Cited

U.S. PATENT DOCUMENTS

| | | | | |
|---|---|---|---|---|
| 2014/0111004 A1* | 4/2014 | Nomura | .................... | H03L 7/00 |
| | | | | 307/11 |
| 2015/0112543 A1* | 4/2015 | Binion | ................ | G06F 17/5095 |
| | | | | 701/32.2 |
| 2015/0160868 A1 | 6/2015 | Sudo et al. | | |
| 2015/0338432 A1* | 11/2015 | Sasaki | ................ | G01C 19/5776 |
| | | | | 73/504.12 |
| 2015/0371602 A1* | 12/2015 | Muto | ....................... | G09G 3/04 |
| | | | | 345/208 |

FOREIGN PATENT DOCUMENTS

| | | |
|---|---|---|
| JP | 2014-175755 A | 9/2014 |
| JP | 2014-178952 A | 9/2014 |
| JP | 2015-094672 A | 5/2015 |

(Continued)

*Primary Examiner* — Omar Casillashernandez
(74) *Attorney, Agent, or Firm* — Harness, Dickey & Pierce, P.L.C.

(57) ABSTRACT

A detection device includes: a detection circuit that performs detection processing based on a signal from a physical quantity transducer and outputs detection data; an interface that has communication connection with an external device and outputs the detection data to the external device; and a processing circuit. The processing circuit outputs the detection data acquired from the detection circuit at a common acquisition timing common to at least one other detection device and the own detection device, to the interface in a data transmitting order of own detection device.

20 Claims, 11 Drawing Sheets

(56) References Cited

FOREIGN PATENT DOCUMENTS

| | | | |
|---|---|---|---|
| JP | 2015-114810 A | | 6/2015 |
| WO | WO-2014141651 | * | 3/2014 |
| WO | WO-2014-136420 A1 | | 9/2014 |
| WO | WO-2014-141651 A1 | | 9/2014 |

* cited by examiner

DETECTION DEVICE, PHYSICAL QUANTITY MEASURING DEVICE, DETECTION SYSTEM, ELECTRONIC DEVICE, AND VEHICLE

BACKGROUND

1. Technical Field

The present invention relates to a detection device, a physical quantity measuring device, a detection system, an electronic device, and a vehicle.

2. Related Art

JP-A-2015-114810 discloses a technology in the related art, as a technology of performing communication between a plurality of sensor devices (physical quantity measuring devices). In the technology in the related art, a method is proposed in which a device ID, the number of connected sensor devices, and an output order of detection data are stored in a storage unit of a detection device, and serial communication is performed between a host device and a plurality of sensor devices. When the host device designates a common address for the plurality of sensor devices and issues a read command thereto, the detection data is transmitted in the output order of the sensor devices, and thus it is possible to simplify connection to the host device, to reduce the number of terminals, to simplify a command, and the like.

However, in the technology in the related art, timings when the detection data is actually updated in the plurality of sensor devices are not considered, and a timing at which the detection data should be transmitted to the host device is not proposed. For example, in order to obtain information such as posture information or movement distance information of a detection target based on items of detection data of a plurality of sensor devices (a gyro sensor, an accelerometer, a geomagnetic sensor, or the like), it is necessary to synchronize the items of detection data with each other or to clearly know a time when the detection data is acquired.

SUMMARY

An advantage of some aspects of the invention is to solve at least a part of the problems described above, and the invention can be implemented as the following forms or embodiments.

An aspect of the invention relates to a detection device including: a detection circuit that performs detection processing based on a signal from a physical quantity transducer and outputs detection data; an interface that has communication connection with an external device and outputs the detection data to the external device; and a processing circuit. The processing circuit outputs the detection data acquired from the detection circuit at a common acquisition timing common to at least one other detection device and the own detection device, to the interface in a data transmitting order of the own detection device.

According to the aspect of the invention, the detection processing is performed by the detection circuit based on the signal from the physical quantity transducer and the detection data from the detection circuit is output to the external device via the interface. At this time, in the aspect of the invention, the detection data acquired from the detection circuit at the common acquisition timing common to at least the one other detection device and the own detection device is output in a data transmitting order of the own detection device. Hence, the timing, at which the detection data is updated and acquired, is clearly known. As a result, it is possible to provide a detection device or the like that is capable of acquiring the detection data at a more appropriate timing and outputting the detection data to the external device.

In the aspect of the invention, the processing circuit may output the detection data acquired at the common acquisition timing to the interface in the data transmitting order of the own detection device, when the processing circuit receives, from the external device, a common destination command with at least the one other detection device and the own detection device as common destinations.

According to this configuration, the external device issues the common destination command with a plurality of the detection devices as the common destination, and thereby the acquisition timings of the detection data are identified such that it is possible to determine the detection data of the detection devices. In this manner, it is possible to perform acquisition processing of the detection data in a simple processing sequence.

In the aspect of the invention, the common acquisition timing, which is a timing after a receiving timing of the common destination command, may be a timing before an output period of the detection data from at least the one other detection device and the own detection device.

According to this configuration, a time lag between outputs of the detection data is optimally reduced, and it is possible to output the detection data from the detection device with the optimal time lag.

In the aspect of the invention, the processing circuit may include a command decoder. The receiving timing of the common destination command may be a timing at which the command decoder determines that the common destination command is received.

According to this configuration, from the timing at which the command decoder determines that the common destination command is received, it is possible to perform a process of acquiring the detection data from the detection circuit.

In the aspect of the invention, the common destination command may be a read command which is issued by the external device, with designation of a common address with at least the one other detection device and the own detection device as common destinations.

According to this configuration, when the read command is received from the external device, it is possible to output the detection data acquired at the common acquisition timing in the own data transmitting order.

In the aspect of the invention, at least one other detection device and the own detection device may detect items of detection data on the same physical quantity and acquire the items of detection data on the same physical quantity at the common acquisition timing.

According to this configuration, in a case where the plurality of detection devices detect items of detection data on the same physical quantity and arithmetic processing is performed based on the same physical quantity, it is possible to realize more appropriate arithmetic processing.

In the aspect of the invention, items of the detection data on the same physical quantity may be items of detection data on the angular velocity around the same axis or the acceleration in the same axial direction.

According to this configuration, in a case where the arithmetic processing is performed, based on the angular velocity around the same axis or the acceleration in the same axial direction, it is possible to realize more appropriate arithmetic processing.

In the aspect of the invention, at least the one other detection device and the own detection device may detect the detection data on different physical quantities from each other and acquire the detection data on the different physical quantities at the common acquisition timings.

According to this configuration, in a case where specific information of the detection target is obtained based on the different physical quantities, the detection data on the different physical quantities is acquired at the common acquisition timings, and thereby it is possible to appropriately obtain corresponding information.

In the aspect of the invention, the interface may output, in a first mode, the detection data acquired at the common acquisition timing, and output, in a second mode, the detection data acquired at a timing before the output period of the detection data from the own detection device.

According to this configuration, the first or second mode is set depending on a use or the like, and thus it is possible to output the detection data in an outputting state in accordance with the first or second mode.

In the aspect of the invention, the detection device may further include: a storage unit that stores information of the data transmitting order of the own detection device. The interface may transmit the detection data to the external device in the data transmitting order stored in the storage unit.

According to this configuration, it is possible to realize efficiency of reading of the detection data by the host device, and it is possible to shorten a time taken to read the detection data.

In the aspect of the invention, the processing circuit may include an output data controlling unit that acquires the detection data at the common acquisition timing among the detection data updated by the detection circuit and performs control of outputting the acquired detection data to the interface.

According to this configuration, it is possible to appropriately output, to the interface, the detection data acquired at the common acquisition timing among the detection data updated by the detection circuit.

In the aspect of the invention, the physical quantity transducer may be a vibrator, and the detection circuit may be a circuit that detects the angular velocity around a predetermined axis.

However, the physical quantity transducer is not limited to such a vibrator, and the detected physical quantity is not limited to such angular velocity around a predetermined axis.

Another aspect of the invention relates to a physical quantity measuring device including: the detection device described above; and the physical quantity transducer.

Still another aspect of the invention relates to a detection system including: the detection device described above; and the external device.

Still another aspect of the invention relates to an electronic device including: the detection device described above.

Still another aspect of the invention relates to a vehicle including: the detection device described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, preferred embodiments of the invention will be described in detail. The content of the invention described in the aspects is not limited to the embodiments to be described below, and the entire configuration to be described in the embodiment is not absolutely required as means for solving the invention.

1. Detection Device

Figure 1:
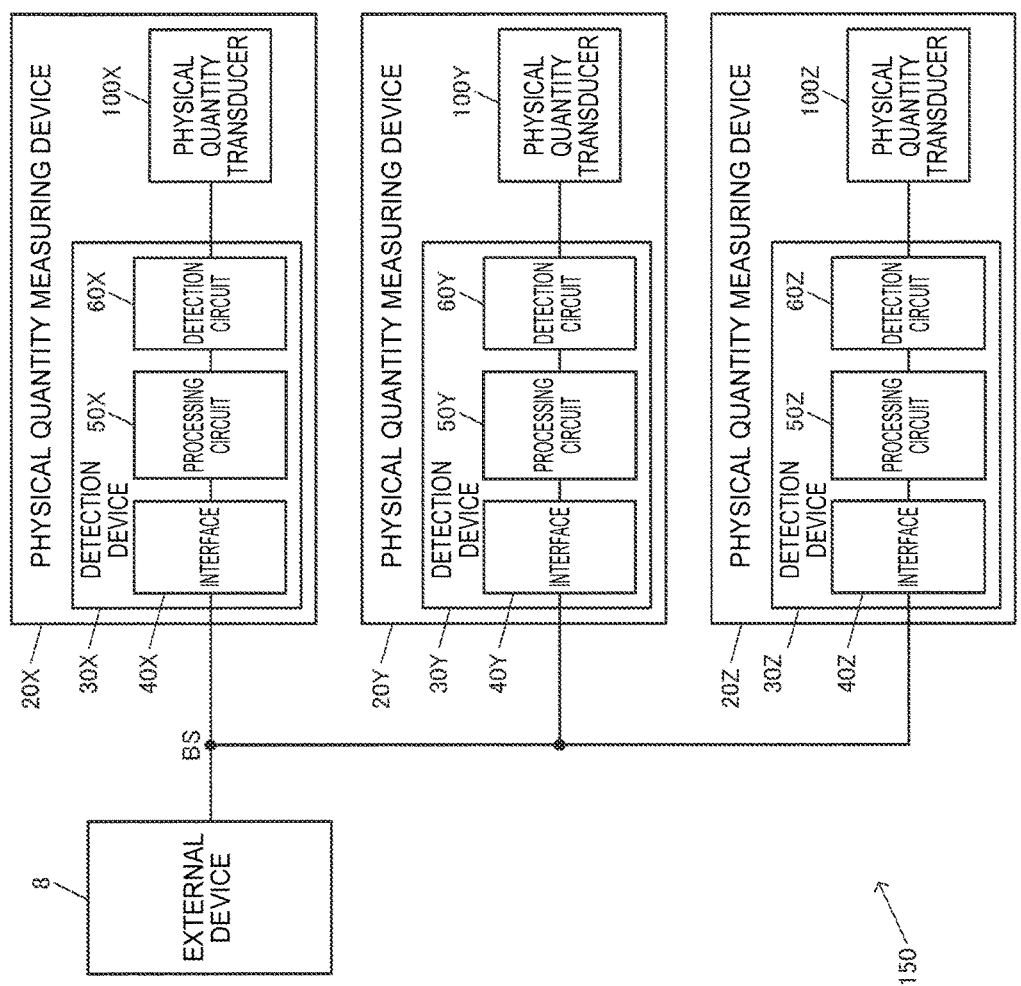
FIG. 1 illustrates configurational examples of a detection device, a physical quantity measuring device, and a detection system of an embodiment.

FIG. 1 illustrates configurational examples of detection devices 30X, 30Y, and 30Z of the embodiment. Physical quantity measuring devices 20X, 20Y, and 20Z (sensors) include the corresponding detection devices 30X, 30Y, and 30Z, respectively, and corresponding physical quantity transducers 100X, 100Y, and 100Z, respectively. A detection system 150 includes an external device 8 and the detection devices 30X, 30Y, and 30Z (the physical quantity measuring devices 20X, 20Y, and 20Z). The external device 8 has communication connection with the detection devices 30X, 30Y, and 30Z via a bus BS (serial bus).

The configurations of the detection devices 30X, 30Y, and 30Z, the physical quantity measuring devices 20X, 20Y, and 20Z, and the detection system 150 are not limited to the configurations in FIG. 1, and it is possible to achieve various types of embodiments obtained by omitting some of configurational elements, adding another configurational element, or the like. For example, in FIG. 1, the three detection devices 30X, 30Y, and 30Z (the three physical quantity measuring devices 20X, 20Y, and 20Z) are provided; however, two devices or four or more devices may be provided. In addition, the detection device 30X of the detection devices 30X, 30Y, and 30Z is described as a main example, and the configuration and an operation thereof are described. The same is true of the configurations and operations of the detection devices 30Y and 30Z. For example, in the following description, the detection device 30X is provided as the own detection device and the detection device 30Y or 30Z is provided as at least one other detection device. At least the one other detection device or three or more other detection devices may be provided.

As illustrated in FIG. 1, the detection device 30X includes an interface 40X, a processing circuit 50X, and a detection circuit 60X.

The detection circuit 60X (60Y or 60Z) performs detection processing based on a signal from a physical quantity transducer 100X (100Y or 100Z) and outputs detection data. The detection circuit 60X is connected to the physical quantity transducer 100X via a signal line. An example of the signal line includes a signal line of a detection signal or a signal line of a drive signal. For example, the detection circuit 60X performs the detection processing such as amplification processing, detection processing, a filtering process, a D/A conversion processing, or the like of a signal, based on a voltage signal, a current signal, or the like from the physical quantity transducer 100X, obtains detection data corresponding to a physical quantity that is detected by the physical quantity transducer 100X, and outputs the detection data to the processing circuit 50X.

The processing circuit 50X (50Y or 50Z) performs various types of processes, based on the detection data from the detection circuit 60X. For example, the processing circuit 50X may perform various types of signal processing such as filtering processing or correction processing such as offset correction (zero-point correction) or sensitivity correction on the detection data. The detection data acquired by the processing circuit 50X from the detection circuit 60X is transmitted to the interface 40X and to the external device 8 via the bus BS.

Here, the physical quantity transducers 100X, 100Y, and 100Z are elements or devices that detect a physical quantity. For example, the physical quantity transducers 100X, 100Y, and 100Z detect physical quantities different from each other. An example of the physical quantity includes angular velocity, angular acceleration, a speed, acceleration, a distance, pressure, acoustic pressure, a magnetic quantity, or time. For example, the physical quantity transducers 100X, 100Y, and 100Z may detect physical quantities on a first axis, a second axis, and a third axis, respectively. For example, the physical quantity on the first axis, the second axis, or the third axis means angular velocity or angular acceleration around the first axis, the second axis, or the third axis or a speed or acceleration in a first, second, or third axial direction. Examples of the first axis, the second axis, and the third axis are an X axis, a Y axis, and a Z axis. Only physical quantities of two axes of the first axis, the second axis, and the third axis may be detected.

The interface 40X (40Y or 40Z) has the communication connection with the external device 8 and outputs the detection data to the external device 8. For example, the interface 40X (an interface circuit and an interface portion) is connected to the external device 8 via the bus BS and performs transmission processing of the detection data in accordance with predetermined communication protocol. For example, the interface 40X may include at least a circuit for a physical layer. For example, the interface 40X can include a buffer circuit for outputting or inputting the signal, a serial/parallel conversion circuit, or a parallel/serial conversion circuit.

For example, the bus BS is a bus such as an SPI or I2C bus satisfying serial communication standards. For example, the bus BS includes a data signal line (serial data signal line). The data signal line may be two signal lines for transmission and reception or may be a signal line shared for transmission and reception. In addition, the bus BS may include a clock signal line. Otherwise, the bus BS may include a chip select signal line. For example, the external device 8 is a host device 10 to be described below; however, the external device is not limited thereto. For example, the external device 8 may be a device other than a device playing a role of a host (master).

In the embodiment, the processing circuit 50X (50Y or 50Z) outputs the detection data acquired from the detection circuit 60X (60Y or 60Z) at a common acquisition timing common to at least the one other detection device 30Y or 30Z and the own detection device 30X, to the interface 40X (40Y or 40Z) in a data transmitting order of the own detection device 30X. For example, the processing circuit 50X acquires the detection data from the plurality of detection devices 30X, 30Y, and 30Z having the communication connection with the external device 8, at the common acquisition timing. The interface 40X outputs the detection data acquired at the common acquisition timing to the external device 8 in the own data transmitting order. The interface 40Y or 40Z also outputs the detection data acquired at the common acquisition timing to the external device 8 via the bus BS in the own data transmitting order.

For example, the processing circuit 50X outputs the detection data acquired at the common acquisition timing to the interface 40X in the data transmitting order of the own detection device 30X, when the processing circuit receives, from the external device 8, a common destination command with at least the one other detection device 30Y or 30Z and the own detection device 30X as common destinations. For example, the interface 40X receives, from the external device 8, the common destination command with the plurality of detection devices 30X, 30Y, and 30Z, as the common destinations, which have the communication connection with the external device 8 via the bus BS. For example, the processing circuit 50X acquires the detection data at the common acquisition timing in a case where the common destination command with such detection devices 30X, 30Y, and 30Z as the common destinations is determined to be received. The interface 40X outputs the detection data acquired at the common acquisition timing to the external device 8 via the bus BS in the own data transmitting order.

Figure 10:
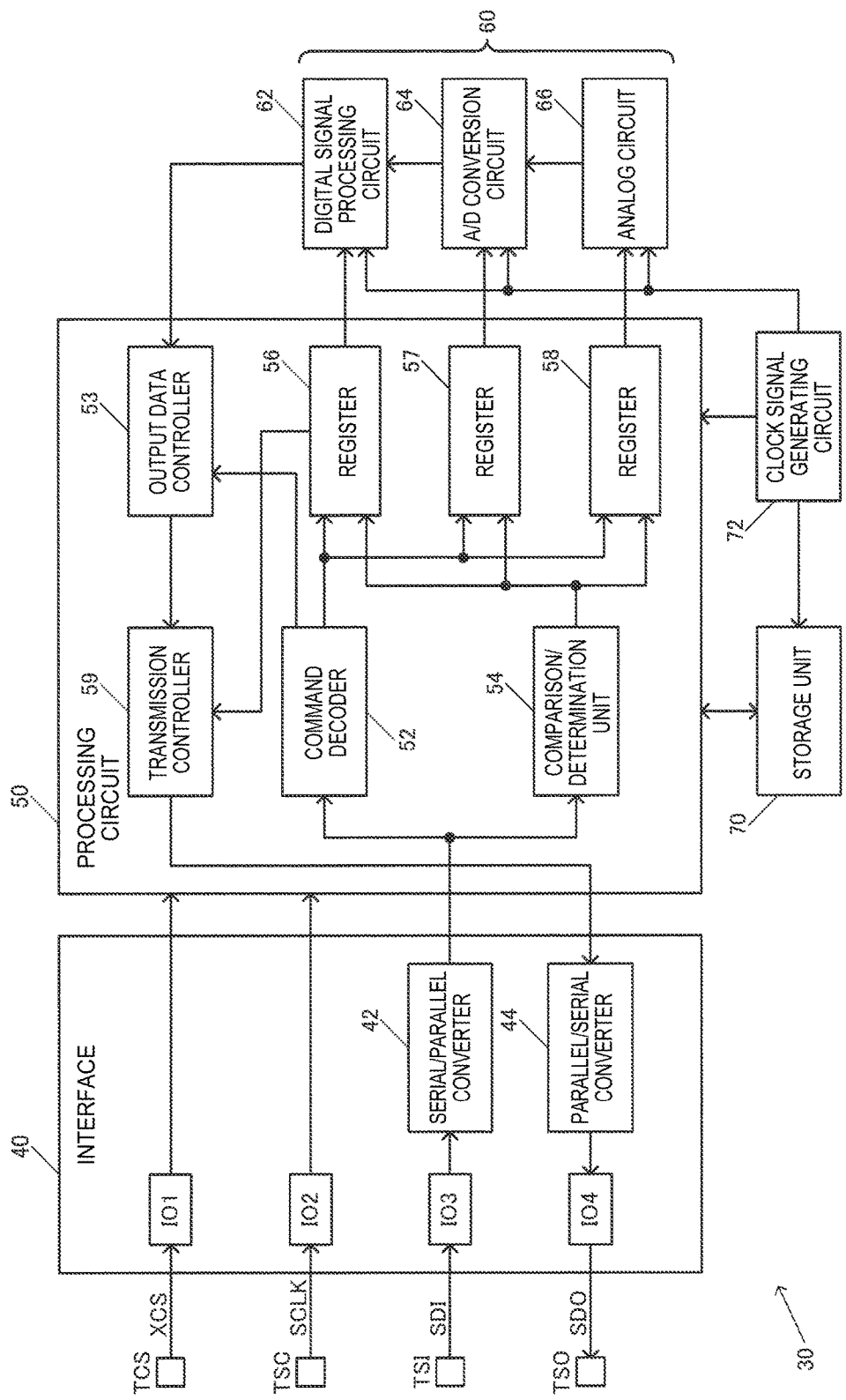
FIG. 10 illustrates detailed configurational examples of an interface, a processing circuit, and a detection circuit.

Here, the common acquisition timing, which is a timing after a receiving timing of the common destination command with the detection devices 30X, 30Y, and 30Z as the common destinations, is a timing before an output period of the detection data from at least the one other detection device 30Y or 30Z and the own detection device 30X. In other words, the common acquisition timing is a timing after the receiving of the common destination command, and the processing circuits 50X, 50Y, and 50Z acquire the detection data at the common acquisition timing which is a timing before the output period during which the detection devices 30X, 30Y, and 30Z output the detection data. The interfaces 40X, 40Y, and 40Z output, in the own data transmitting order, the detection data acquired at the common acquisition timing. Here, the processing circuits 50X, 50Y, and 50Z include a command decoder 52 as illustrated in FIG. 10 to be described below. The receiving timing of the common destination command is a timing at which the command decoder 52 determines that the common destination command is received.

Figure 6:
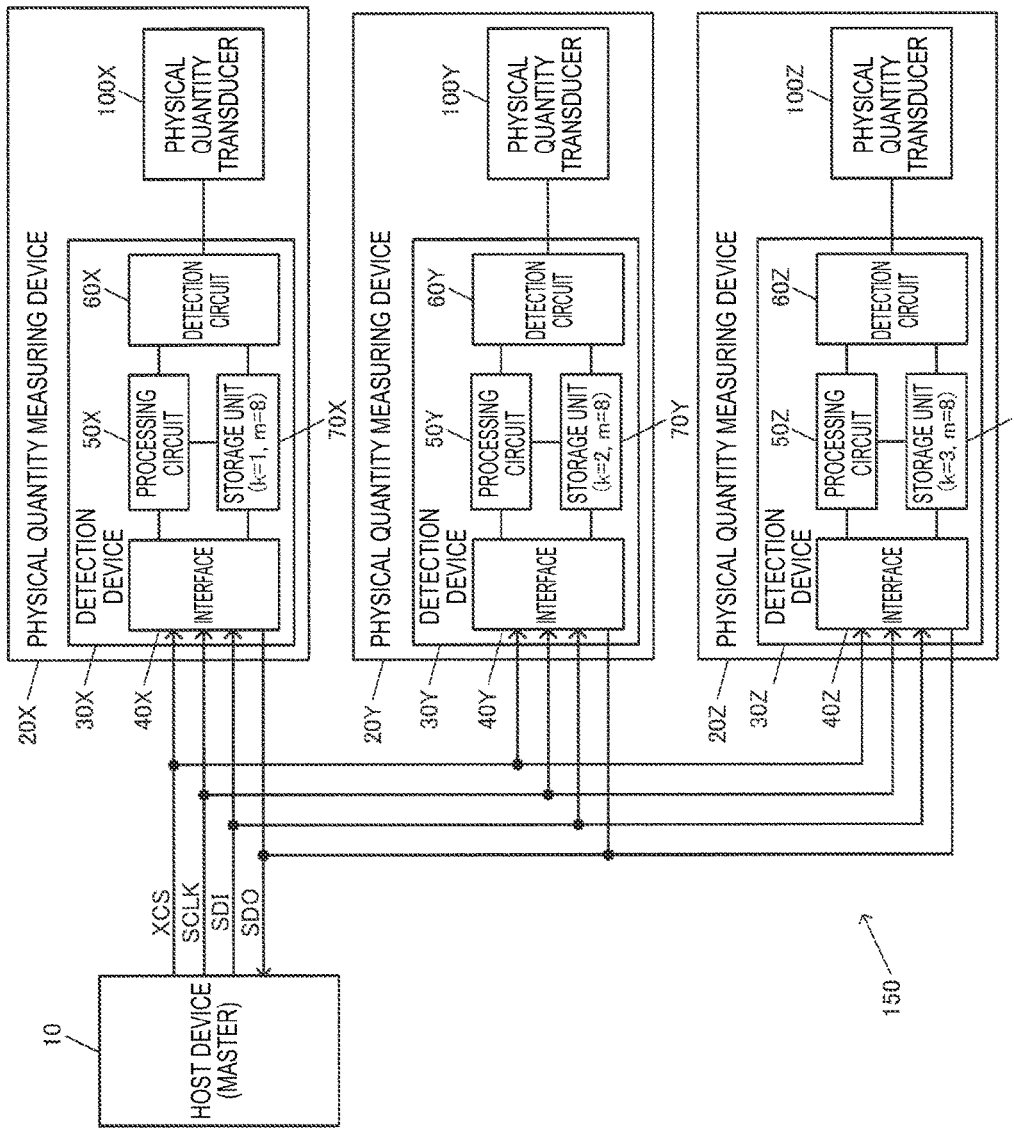
FIG. 6 illustrates detailed configurational examples of the detection device, the physical quantity measuring device, and the detection system of the embodiment.
Figure 7:
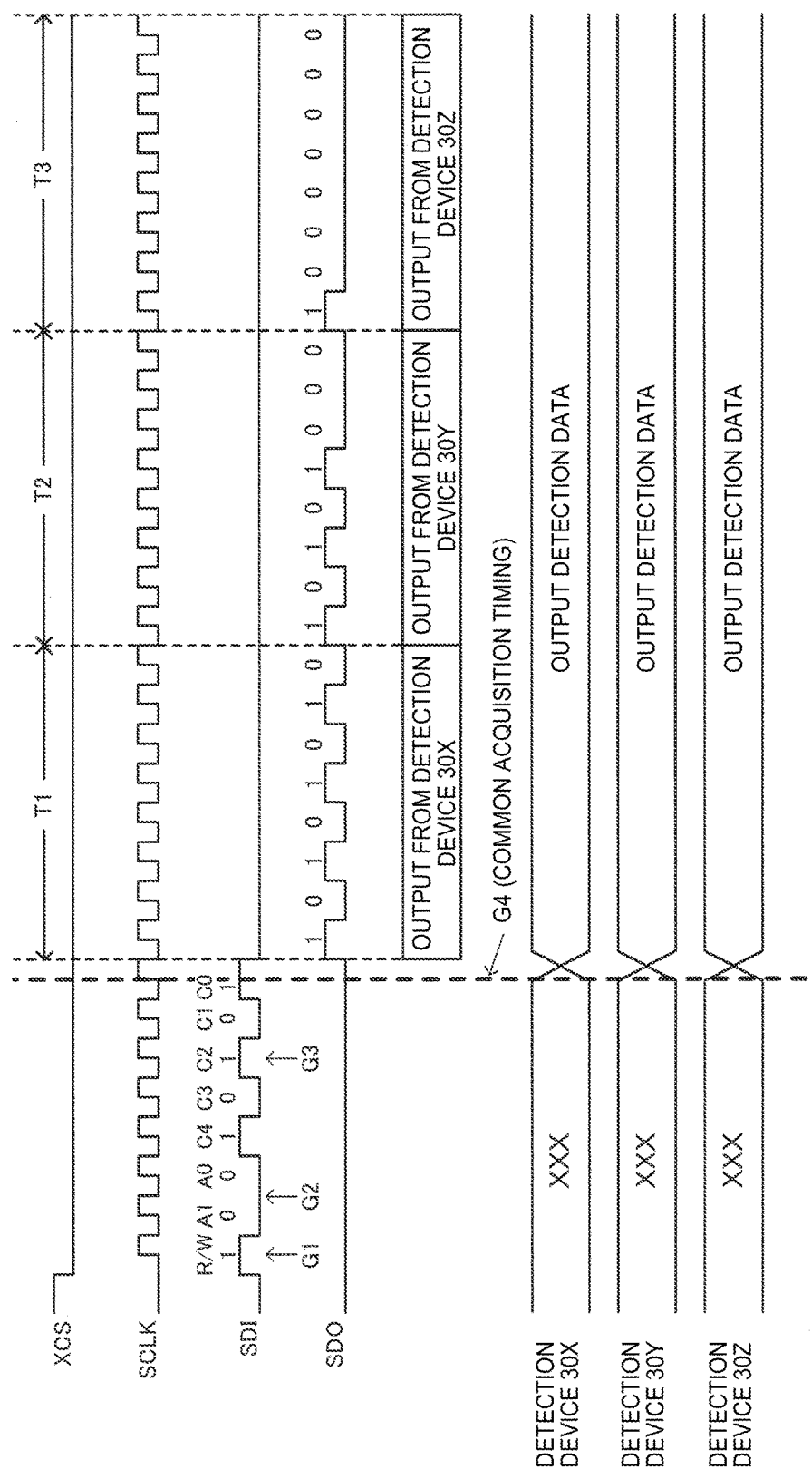
FIG. 7 is an example of a signal waveform illustrating an operation of the detailed configurational examples.

In addition, as illustrated in FIGS. 6 and 7 to be described below, the common destination command is a read command that is issued by the external device 8, with designation of a common address (for example, 00) with at least the one other detection device 30Y or 30Z and the own detection device 30X as the common destinations. However, the common destination command is not limited to such a read command but may be a specific command (a command other than the read command) in which the external device 8 instructs the detection devices 30X, 30Y, and 30Z to acquire the detection data at the common acquisition timing.

Figure 2:
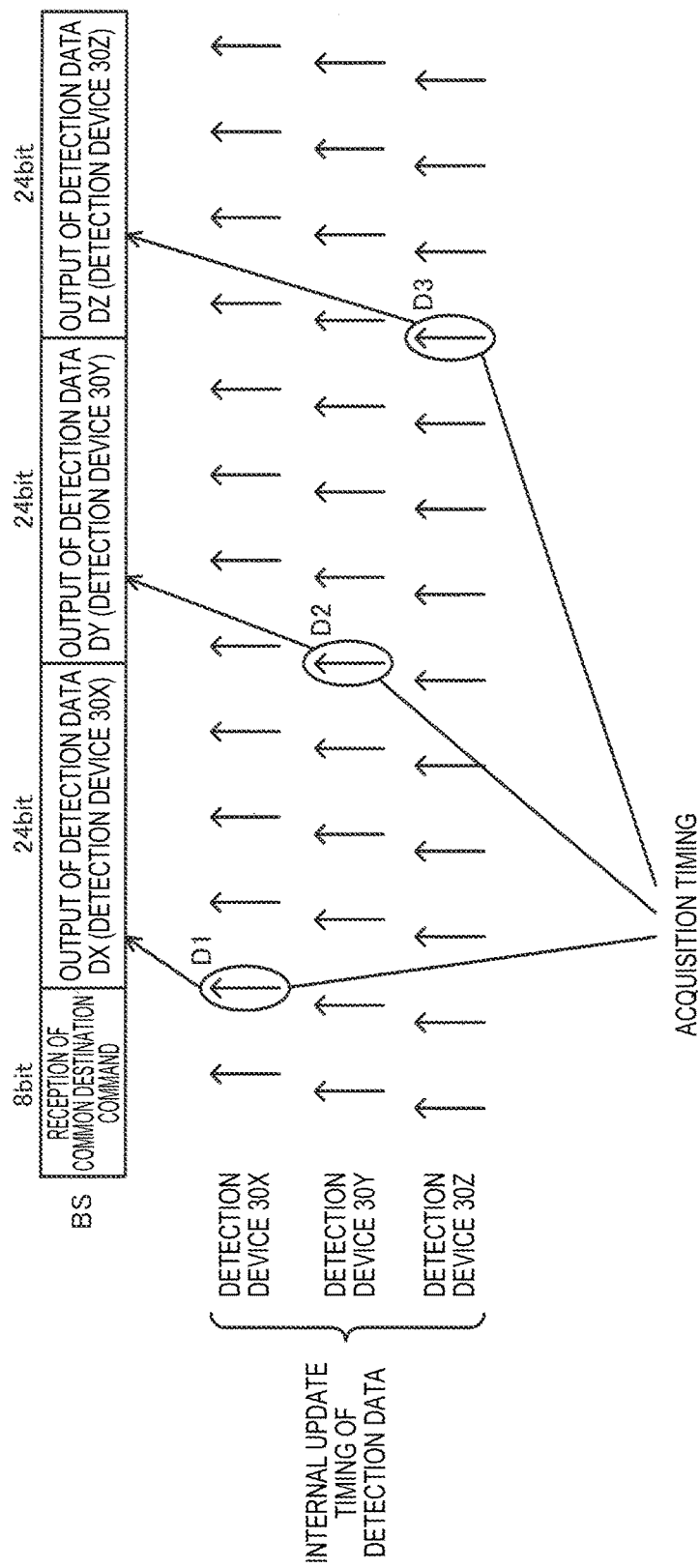
FIG. 2 is a diagram illustrating an operation of a method of a comparative example.

FIG. 2 is a diagram illustrating an operation for a method in a comparative example of the embodiment. The detection devices 30X, 30Y, and 30Z receive the common destination command with the detection devices 30X, 30Y, and 30Z as the common destinations from the external device 8 via the bus BS. When receiving the common destination command, the detection devices 30X, 30Y, and 30Z output detection data DX, DY, and DZ in the own data transmitting order. In FIG. 2, the detection device 30X outputs the detection data DX. Next, the detection device 30Y outputs the detection data DY. Next, the detection device 30Z outputs the detection data DZ. Here, the common destination command is an 8-bit command, and the detection data DX, DY, and DZ are 24-bit data. However, the number of bits of the common destination command or the detection data is not limited thereto.

The detection devices 30X, 30Y, and 30Z performs internal update of the detection data at timings as illustrated in FIG. 2. For example, the detection circuits 60X, 60Y, and 60Z of the detection devices 30X, 30Y, and 30Z perform the detection processing of the detection data at an internal update timing illustrated in FIG. 2 and output the detection data to the processing circuits 50X, 50Y, and 50Z. The detection device 30X outputs the detection data DX acquired at an acquisition timing represented by D1 in FIG. 2, to the bus BS in the own data transmitting order. The detection device 30Y outputs the detection data DY acquired at an acquisition timing represented by D2, to the bus BS in the own data transmitting order. The detection device 30Z outputs the detection data DZ acquired at an acquisition timing represented by D3, to the bus BS in the own data transmitting order. The acquisition timings of D1, D2, and D3 are timings before (immediately before) the output periods of the detection data DX, DY, and DZ to the bus BS. In other words, the detection devices 30X, 30Y, and 30Z output, to the bus BS, the detection data DX, DY, and DZ acquired immediately before the output period.

Here, the detection devices 30X, 30Y, and 30Z operate, based on a clock signal from a clock signal generating circuit 72 in FIG. 9 to be described below, which is provided inside the detection device. The clock signal generating circuit 72 generates a clock signal by using a vibrator 110 in FIG. 9 to be described below or generates a clock signal by using an oscillation circuit such as a CR oscillation circuit. Therefore, clock signals used in the detection devices 30X, 30Y, and 30Z are not synchronized with each other and are not synchronized with each other at the internal update timing of the detection data as illustrated in FIG. 2.

For example, in order to appropriately obtain information such as posture information or movement distance information of a detection target, based on items of detection data DX, DY, and DZ from the plurality of detection devices 30X, 30Y, and 30Z, it is desirable that whether the items of detection data DX, DY, and DZ are synchronized with each other or a time of acquiring the detection data DX, DY, and DZ is clear.

However, in the method of the comparative example in FIG. 2, as represented by D1, D2, and D3, the acquisition timings of the items of detection data DX, DY, and DZ are different from each other and the items of detection data are not synchronized with each other. For example, the acquisition timing (D3) of the detection data DZ of the detection device 30Z is a timing more delayed by 48 bits than the acquisition timing (D1) of the detection data DX of the detection device 30X. In addition, in a case where reading of the detection data DX, DY, and DZ is performed, based on a reading clock signal (SCLK in FIG. 6 to be described below) from the external device 8, the frequency or the output timing of the reading clock signal depends on the process of the external device 8. Therefore, a problem arises in that it is not possible to clearly identify which timing D1, D2, or D3 in FIG. 2 indicates.

Figure 5:
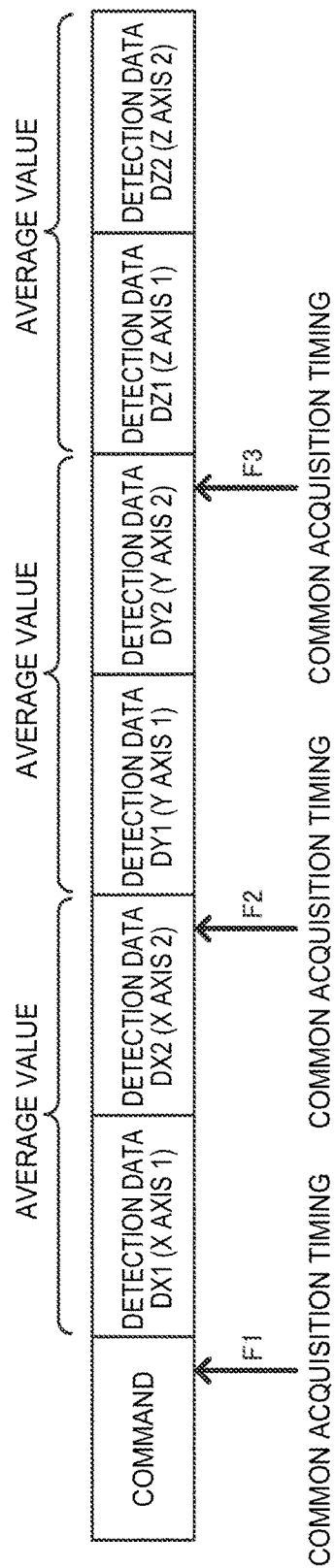
FIG. 5 is a diagram illustrating an operation of the second configurational example.

As described above, in the method of the comparative example in FIG. 2, acquisition timings of the detection data DX, DY, and DZ are likely to be different timings (D1, D2, and D3), the synchronization is not performed, and thus it is not possible to clearly identify which timing is the acquisition timing thereof. Hence, in a case of obtaining the information such as the posture information or the movement distance information of the detection target by using the detection data DX, DY, and DZ, a problem arises in that it is not possible to acquire appropriate information. For example, in a case where the detection data DX, DY, and DZ is angular velocity data around the X axis, the Y axis, and the Z axis, the detection data DX, DY, and DZ that is the angular velocity data around the X axis, the Y axis, and the Z axis is data acquired at different timings in the method of the comparative example in FIG. 2. Hence, there is a concern that the posture information of the detection target which is identified, based on the detection data DX, DY, and DZ, will be unclear information. Similarly, in a case where the detection data DX, DY, and DZ is the acceleration data in the X-axial, Y axial, and Z-axial direction, there is a concern that the movement distance information of the detection target which is identified, based on the detection data DX, DY, and DZ, will be unclear information. In addition, as illustrated in FIG. 5, the angular velocity data or the acceleration data on the same coordinate axis is detected by using a plurality of detection devices, and an average value thereof may be obtained. Also in this case, in the method of the comparative example in FIG. 2, a problem arises in that the acquisition timing of the detection data used for obtaining an average value will be different timings, and thus it is not possible to obtain an appropriate average value.

The embodiment for solving such problems employs a method in which the detection data acquired at a common acquisition timing common to the detection devices 30X, 30Y, and 30Z is output in the own data transmitting order.

Figure 3:
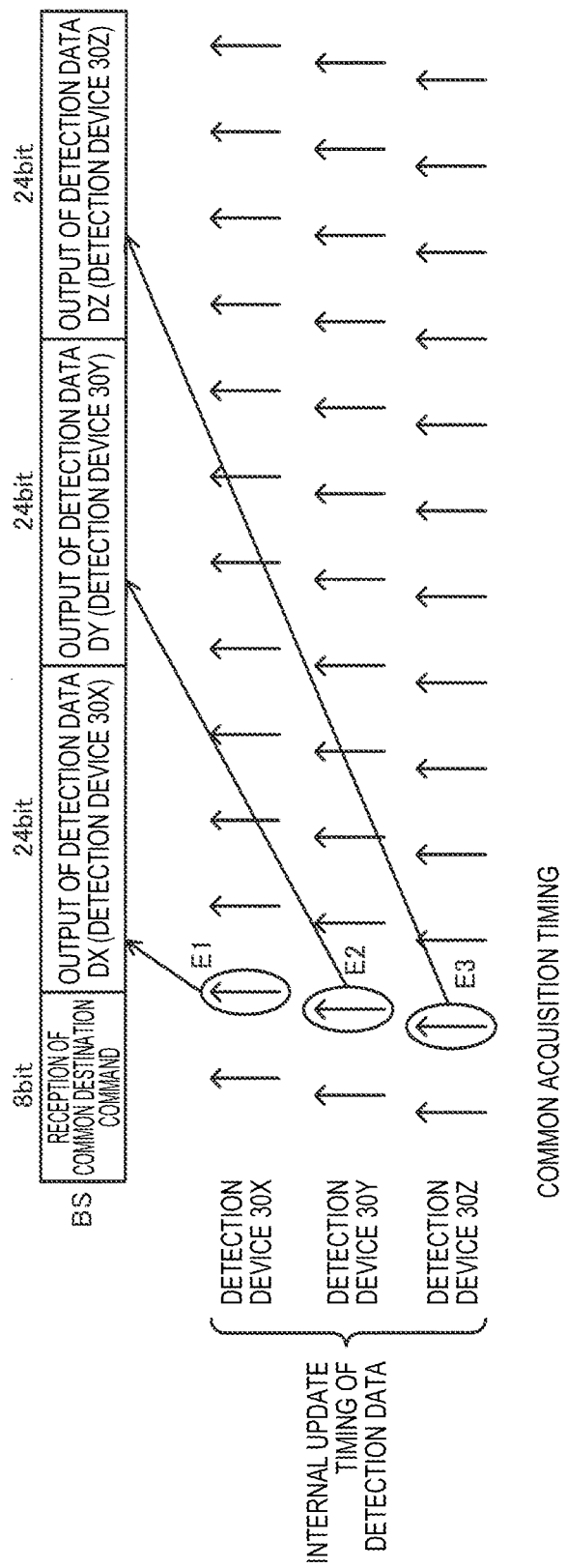
FIG. 3 is a diagram illustrating an operation of a method of the embodiment.

For example, similar to FIG. 2, the detection devices 30X, 30Y, and 30Z receive a common destination command with the detection devices 30X, 30Y, and 30Z as the common destinations from the external device 8 via the bus BS in FIG. 3. When receiving the common destination command, the detection devices 30X, 30Y, and 30Z output the detection data DX, DY, and DZ in the own data transmitting order. In addition, the detection devices 30X, 30Y, and 30Z performs internal update of the detection data at timings as illustrated in FIG. 3.

In the embodiment, the processing circuits 50X, 50Y, and 50Z of the detection devices 30X, 30Y, and 30Z acquire the detection data DX, DY, and DZ from the detection circuits 60X, 60Y, and 60Z at common acquisition timings as represented by E1, E2, and E3. The detection devices 30X, 30Y, and 30Z output the detection data DX, DY, and DZ acquired at the common acquisition timings represented by E1, E2, and E3, in the own data transmitting order. Specifically, the detection device 30X outputs, to the bus BS, the detection data DX acquired at the common acquisition timing represented by E1. Next, the detection device 30Y outputs, to the bus BS, the detection data DY acquired at the common acquisition timing represented by E2. Next, the detection device 30Z outputs, to the bus BS, the detection data DZ acquired at the common acquisition timing represented by E3.

As described above, in the embodiment, the detection data DX, DY, and DZ acquired at the common acquisition timings is sequentially output in the own data transmitting order. Hence, it is possible to clearly know which timing the detection data DX, DY, and DZ of the detection devices 30X, 30Y, and 30Z is updated. For example, it is possible to simultaneously determine the detection data DX, DY, and DZ of the detection devices 30X, 30Y, and 30Z. Hence, in a case of obtaining the information such as the posture information or the movement distance information of the detection target by using the detection data DX, DY, and DZ, it is possible to acquire appropriate information. For example, in a case where the detection data DX, DY, and DZ is the angular velocity data around the X axis, the Y axis, and the Z axis, it is possible to obtain the posture information of the detection target, based on the detection data DX, DY, and DZ acquired at the common acquisition timings as represented by E1, E2, and E3 in FIG. 3, and thus it is possible to acquire appropriate posture information. In addition, in a case where the detection data DX, DY, and DZ is the acceleration data in the X-axial, Y-axial, and Z axial directions, it is possible to obtain the movement distance information of the detection target, based on the detection data DX, DY, and DZ acquired at the common acquisition timings, and thus it is possible to acquire appropriate movement distance information. In addition, as illustrated in FIG. 5, in a case where the angular velocity data or the acceleration data on the same coordinate axis is detected by using the plurality of detection devices and an average value thereof is obtained, it is possible to obtain the average value (statistical value), based on the detection data DX, DY, and DZ acquired at the common acquisition timings, and thus it is possible to obtain an appropriate average value.

At E1, E2, and E3 in FIG. 3, the common acquisition timings are not completely coincident timings. Fr example, the detection devices 30X, 30Y, and 30Z operate, based on the clock signal generated by the internally-provided clock signal generating circuit 72. Therefore, internal update timings of the detection data DX, DY, and DZ are not synchronized with each other, and the common acquisition timings represented by E1, E2, and E3 are not synchronized with each other, either. Thus, the timings do not become coincident timings. In other words, the common acquisition timings may be timings within a common acquisition period. For example, the common acquisition timings may be timings deviated by one clock cycle or several clock cycles of the clock signal or may be timings within a period of one clock cycle or several clock cycles. For example, in the method of the comparative example in FIG. 2, the acquisition timings are the timings deviated by a length equal to or longer than a length of the output period of the items of detection data; however, the common acquisition timings are deviated by a length shorter than the length of the output period of the items of detection data.

In addition, in the embodiment, when the common destination command with the detection devices 30X, 30Y, and 30Z as the common destinations is received from the external device 8, the items of detection data DX, DY, and DZ acquired at the common acquisition timings are output in the own data transmitting order. In this manner, the external device 8 issues a command such as the read command in which the common address for the detection devices 30X, 30Y, and 30Z is designated, and thereby the acquisition timings of the detection data are identified such that it is possible to simultaneously determine the detection data DX, DY, and DZ of the detection devices 30X, 30Y, and 30Z. Hence, the detection data DX, DY, and DZ is acquired at timings after a given number of clock cycles from when the detection devices 30X, 30Y, and 30Z receive the common destination command, and thereby it is possible to perform acquisition processing of the detection data DX, DY, and DZ at the common acquisition timings as represented by E1, E2, and E3 in FIG. 3. Hence, it is possible to perform the acquisition processing of the detection data DX, DY, and DZ in a simple processing sequence.

In FIG. 3, the common acquisition timing is identified by using the common destination command with the detection devices 30X, 30Y, and 30Z as the common destination; however, the embodiment is not limited thereto. For example, the common acquisition timing may be identified by terminal setting. For example, the detection devices 30X, 30Y, and 30Z may be provided with a setting terminal of the common acquisition timing. The external device 8 outputs a signal for identifying a timing to the setting terminal, and thereby the detection devices 30X, 30Y, and 30Z may identify the common acquisition timings. In addition, the detection device 30X may output the common acquisition timing signal, the detection devices 30Y and 30Z may receive the common acquisition timing signal, and the common acquisition timing may be identified. In addition, the common acquisition timing can be a timing that is identified in digital sequence processing of the processing circuit 50X. For example, the digital circuit of the processing circuit 50X is configured (designed) to acquire the detection data at the common acquisition timing. For example, the common acquisition timing is set depending on the number of clock cycles of an operation clock signal of the processing circuit 50X. For example, a clock cycle of the operation clock signal in which the detection data is acquired is set, and thereby the acquisition processing of the detection data at the common acquisition timing is realized.

Figure 4:
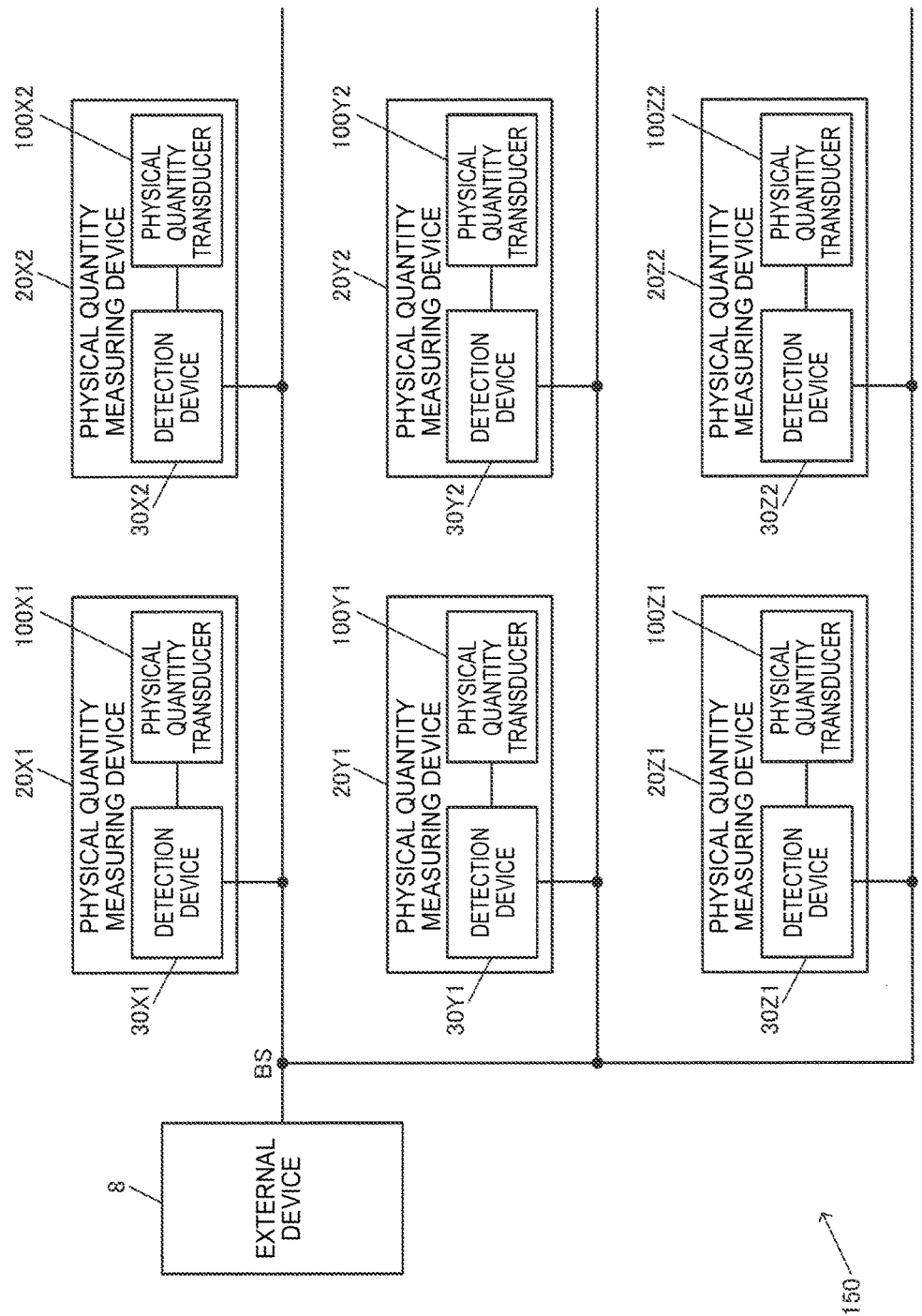
FIG. 4 illustrates a second configurational example of the embodiment.

FIG. 4 illustrates a second configurational example of the embodiment. The detection devices detect different physical quantities from each other in the configurational example in FIG. 1; however, the detection devices detect the same physical quantity in the second configurational example in FIG. 4.

In other words, in FIG. 1, the detection device 30Y or 30Z, which is at least the one other detection device, and the own detection device 30X detect the detection data on different physical quantities from each other and acquire the detection data on the different physical quantities at the common acquisition timings. As an example, the detection device 30Y detects angular velocity around the Y axis or acceleration in the Y-axial direction, and the detection device 30Z detects angular velocity around the Z axis or acceleration in the Z-axial direction. On the other hand, the detection device 30X detects angular velocity around the X axis or acceleration in the X-axial direction and detects a different physical quantity from the detection devices 30Y and 30Z. In a case where information such as posture information or movement distance information of the detection target is obtained based on the different physical quantities from each other, the detection data on the different physical quantities from each other is acquired at the common acquisition timings, and thereby it is possible to appropriately obtain corresponding information.

On the other hand, in FIG. 4, a detection device 30X2, which is at least the one other detection device, and a own detection device 30X1 detect detection data on the same physical quantity and acquire the detection data on the same physical quantity at the common acquisition timing. In addition, a detection device 30Y2, which is at least the one other detection device, and an own detection device 30Y1 detect detection data on the same physical quantity and acquire the detection data on the same physical quantity at the common acquisition timing. The same is true of a detection device 30Z2 and a detection device 30Z1. As described above, in a case where the same physical quantity is detected and arithmetic processing such as statistical processing is performed based on the same physical quantity, it is possible to realize more appropriate arithmetic processing. For example, in a case where the arithmetic processing of obtaining an average value on the same physical quantity is performed, it is possible to realize more appropriate arithmetic processing of the average value.

Here, items of the detection data on the same physical quantity are items of detection data on the angular velocity around the same axis or the acceleration in the same axial direction. For example, the detection device 30X1 and the detection device 30X2 detect angular velocity around a first axis, acceleration in a first axial direction, or the like and detect the same physical quantity. The detection device 30Y1 and the detection device 30Y2 detect angular velocity around a second axis, acceleration in a second axial direction, or the like and detect the same physical quantity. The detection device 30Z1 and the detection device 30Z2 detect angular velocity around a third axis, acceleration in a third axial direction, or the like and detect the same physical quantity. In this manner, in a case where the arithmetic processing such as statistical processing of the angular velocity or the acceleration is performed, it is possible to realize more appropriate arithmetic processing. For example, in a case where the arithmetic processing of obtaining an average value of the angular velocity or the acceleration is performed, it is possible to obtain more appropriate the average value. For example, in a case where the external device 8 performs integral processing (integration processing) of the angular velocity and obtains an angle, or performs integral processing of acceleration and obtains a speed or a distance, it is possible to obtain information of an angle, a speed, a distance, or the lie with higher accuracy.

FIG. 5 is a diagram illustrating an operation of the second configurational example in FIG. 4. Items of detection data DX1 and DX2 in FIG. 5 are items of detection data of the detection devices 30X1 and 30X2 in FIG. 4. For example, the detection data DX1 and DX2 is the angular velocity around the X axis or the acceleration in the X-axial direction. In addition, items of detection data DY1 and DY2 are items of detection data of the detection devices 30Y1 and 30Y2, and items of detection data DZ1 and DZ2 are items of detection data of the detection devices 30Z1 and 30Z2. For example, the items of detection data DY1 and DY2 are the angular velocity around the Y axis or the acceleration in the Y-axial direction, and the items of detection data DZ1 and DZ2 are the angular velocity around the Z axis or the acceleration in the Z-axial direction.

The items of detection data DX1 and DX2 are data acquired at a common acquisition timing represented by F1 in FIG. 5. In other words, the timing represented by F1 is the common acquisition timing of the detection devices 30X1 and 30X2, and the detection devices 30X1 and 30X2 acquire the detection data DX1 and DX2 at the timing of F1. For example, the external device 8 performs the arithmetic processing of obtaining an average value of the detection data DX1 and DX2.

In addition, items of detection data DY1 and DY2 are data acquired by the detection devices 30Y1 and 30Y2 at a common acquisition timing represented by F2 in FIG. 5. For example, the external device 8 performs the arithmetic processing of obtaining an average value of the detection data DY1 and DY2. Similarly, items of detection data DZ1 and DZ2 are acquired by the detection devices 30Z1 and 30Z2 at a common acquisition timing represented by F3. For example, the external device 8 performs the arithmetic processing of obtaining an average value of the detection data DZ1 and DZ2.

As described above, by performing the processing of obtaining the average value of the items of detection data, it is possible to detect a physical quantity corresponding to the detection data with high accuracy. For example, by performing averaging processing of the items of detection data, it is possible to reduce noise components, and thus it is possible to acquire a detection value of a physical quantity having a higher S/N ratio. FIGS. 4 and 5 illustrate a case where the same physical quantity such as the angular velocity or the acceleration is detected by two detection devices and the averaging processing is performed; however, three or more detection devices that detect the same physical quantity may be provided. The number of detection devices that detect the same physical quantity is increased, and thereby it is possible to more increase accuracy of the detection of the physical quantity.

2. Detailed Configurational Examples

FIG. 6 illustrates detailed configurational examples of the detection devices 30X, 30Y, and 30Z, the physical quantity measuring devices 20X, 20Y, and 20Z, and the detection system 150. In FIG. 6, the host device 10 (the external device in a broad sense), which is a master, has communication connection with the detection devices 30X, 30Y, and 30Z, which are slaves, through a serial peripheral interface (SPI). XCS represents a chip select signal, SCLK represents a clock signal, SDI represents a data input signal, and SDO represents a data output signal. The host device 10 can be realized by various types of processors (a CPU and a MPU), a hardware circuit such as an ASIC, or the like. For example, a microcomputer can be used as the host device 10 (host controller). Physical quantity measuring devices 20X, 20Y, and 20Z include the corresponding detection devices 30X, 30Y, and 30Z, respectively, and the corresponding physical quantity transducers 100X, 100Y, and 100Z, respectively, and are a gyro sensor for the X axis, a gyro sensor for the Y axis, and a gyro sensor for the Z axis, respectively. The gyro sensors have the communication connection with each other through the SPI, and thereby a multi-axis gyro sensor is realized. In FIG. 6, the three physical quantity measuring devices (sensors) 20X, 20Y, and 20Z are provided; however, two physical quantity measuring devices or four or more physical quantity measuring devices may be provided. In addition, the physical quantity measuring devices 20X, 20Y, and 20Z may be a sensor other than the gyro sensor or may be an accelerometer or the like, for example. In this case, the physical quantity measuring devices 20X, 20Y, and 20Z are an accelerometer for the X axis, an accelerometer for the Y axis, and an accelerometer for the Z axis.

Hereinafter, a case where the physical quantity transducers 100X, 100Y, and 100Z are piezoelectric vibrators (vibration gyroscopes), and the physical quantity measuring devices 20X, 20Y, and 20Z are the gyro sensors is described as a main example; however, the embodiment is not limited thereto. For example, the embodiment is applicable to various types of the physical quantity transducers such as a capacitance detection type vibrator (vibration gyroscope) formed of a silicon substrate, a sensor (accelerometer) that detects a physical quantity equivalent to angular velocity information or a physical quantity other than the angular velocity information, or the like.

The detection device 30X (30Y or 30Z) includes the interface 40X (40Y or 40Z), the processing circuit 50X (50Y or 50Z), the detection circuit 60X (60Y or 60Z), and a storage unit 70X (70Y or 70Z).

The detection circuit 60X performs detection processing of a desired signal, based on a signal from the physical quantity transducer 100X. An analog detection signal obtained by the detection processing is subjected to A/D conversion and digital detection data is output. In a case where the physical quantity measuring devices 20X, 20Y, and 20Z are the gyro sensors, the physical quantity transducers 100X, 100Y, and 100Z are the vibrators, and the detection circuit 60X is a circuit that detects the angular velocity around the X axis (around a predetermined axis in abroad sense). The detection data of the detection circuit 60X is angular velocity data around the X axis. In addition, the detection circuits 60Y and 60Z are circuits that detect the angular velocity around the Y axis and the Z axis, respectively, and the detection data of the detection circuits 60Y and 60Z is angular velocity data around the Y axis and the Z axis. In addition, in this case, a drive circuit that drives the vibrator is further provided.

The interface 40X performs communication with the host device 10 which is the master. For example, the interface 40X performs communication with the host device 10 by using the clock signal SCLK, the data input signal SDI, and the data output signal SDO.

Specifically, in FIG. 6, the clock signal SCLK, the data input signal SDI, and the data output signal SDO are common to the detection devices 30X, 30Y, and 30Z, and signal lines of the SCLK, SDI, and SDO of the host device 10 are commonly connected to the detection devices 30X, 30Y, and 30Z. The interface 40X performs communication with the host device 10, for example, by a communication method of the SPI by using the clock signal SCLK, the data input signal SDI, and the data output signal SDO.

In addition, in FIG. 6, the chip select signal XCS is common to the detection devices 30X, 30Y, and 30Z, and a signal line of the XCS of the host device 10 is commonly connected to the detection devices 30X, 30Y, and 30Z.

The storage unit 70X stores various types of information. The storage unit 70X (70Y or 70Z) can be realized by a non-volatile memory or the like such as an erasable programmable ROM (EPROM) or a one time programmable ROM (OTP). The storage unit 70X (70Y or 70Z) may be realized by a semiconductor memory other than the non-volatile memory.

The storage unit 70X stores information of a data transmitting order of the own detection device 30X. For example, the storage unit stores the information of the data transmitting order of the own detection device 30X of the plurality of detection devices 30X, 30Y, and 30Z, as the slaves, which have the communication connection with the host device 10. Similarly, the storage unit 70Y of the detection device 30Y stores information of a data transmitting order of the own detection device 30Y, and the storage unit 70Z of the detection device 30Z stores information of a data transmitting order of the own detection device 30Z. The information of the data transmitting order may be the data transmitting order as it is or may be information for identifying the data transmitting order.

The host device 10 designates a common address (for example, 00) with the detection devices 30X, 30Y, and 30Z (the plurality of detection devices) as the common destinations, which have the communication connection with the host device 10 and issues the read command. In this case, the interface 40X transmits the detection data to the host device 10 in the own data transmitting order stored in the storage unit 70X.

On the other hand, the host device 10 designates an individual address (slave address) and issues a read command. In this case, the interface 40X transmits the detection data to the host device 10 in a case where the individual address designated by the host device 10 matches an individual address (for example, 01) of the own detection device 30X (the physical quantity measuring device 20X).

For example, as illustrated in FIG. 6, the storage units 70X, 70Y, and 70Z store information of k for designating a transmitting order, and the transmitting orders of the detection devices 30X, 30Y, and 30Z are set as k=1, k=2, and k=3, respectively. In addition, the common address is (00), the individual addresses of the detection devices 30X, 30Y, and 30Z are (01), (10), and (11), respectively.

In this case, when the host device 10 designates the common address (00) and issues the read command, the interface 40X of the detection device 30X transmits the detection data in a first transmitting order (k=1). In addition, the interface 40Y of the detection device 30Y transmits detection data in a second transmitting order (k=2), and the interface 40Z of the detection device 30Z transmits detection data in a third transmitting order (k=3).

On the other hand, when the host device 10 designates the individual address (01) and issues the read command, the interface 40X of the detection device 30X transmits the detection data. Similarly, in a case where the individual addresses (10) and (11) are designated, the interfaces 40Y and 40Z transmit the respective items of detection data.

In addition, the storage unit 70X stores information of the number of connections of the detection devices having the communication connection with the host device 10. For example, in FIG. 6, since the number of connections is n=3, the information of n=3 is stored. Similarly, the storage units 70Y, and 70Z also store the information of the number of connections. The information of the number of connections may be the number of connections as it is or may be information for identifying the number of connections.

In addition, n represents the number of connections of the detection devices, and k represents the data transmitting order (k and n are natural numbers satisfying 1≤k≤n). In this case, after the interface 40X transmits the detection data to the host device 10 in the first order (a k-th order and k=1) as the data transmitting order, the interface 40X transmits the detection data to the host device 10 in a fourth order (an n+k-th order). Similarly, the detection data is transmitted in a seventh order (a 2n+k-th order) or in a tenth order (a 3n+k-th order). The same is true of operations of the interfaces 40Y and 40Z.

In addition, the storage units 70X, 70Y, and 70Z store information of the number of bits m of transmission data of the detection data. A user can arbitrarily set the number of bits of transmission data. The interfaces 40X, 40Y, and 40Z transmit the number of bits m of transmission data of the detection data to the host device 10 in the own data transmitting order.

In addition, in the embodiment, when the common destination command with the detection devices 30X, 30Y, and 30Z as the common destinations is received from the host device 10 which is the external device 8, the interface 40X outputs the detection data acquired at the common acquisition timing in the own data transmitting order. In FIG. 6, the common destination command is a read command that is issued by the host device 10 (external device), with the designation of the common address with at least the one other detection device 30Y or 30Z and the own detection device 30X as the common destinations.

Here, the common address (global address) means an address with a plurality of slaves, which have the communication connection with the host, as the common destinations. For example, the common address is an address with all of the plurality of slaves as destinations. Hence, in a case where the common address is designated by the host, all of the slaves operate. On the other hand, in a case where an individual address is designated by the host, the slave performs communication only in a case where the individual address designated by the host matches an own individual address. Data is output to a terminal of the SDO of the slave only in a case where addresses match each other, and a high impedance state is set to the terminal in a case where the addresses do not match each other. In this manner, collision of signals is avoided.

FIG. 7 is an example of a signal waveform illustrating an operation of the detailed configurational examples of the embodiment. First 1-bit R/W of the data input signal SDI in FIG. 7 is a bit for instructing read/write. In a case where R/W=1, read is instructed. In a case where R/W=0, write is instructed. The next 2-bit A [1:0] of the R/W indicates the designation of the address. In a case of designating the common address, A [1:0]=00. In a case of designating individual addresses of the detection devices 30X, 30Y, and 30Z, A [1:0]=01, 10, 11, respectively. The next 4-bit C [4:0] of A [1:0] indicates an instruction of command contents and a register address.

In FIG. 7, R/W=1 as represented by G1, the read is instructed, and the host device 10 issues a read command. In addition, A [1:0]=00 as represented by G2, the common address is designated. In addition, as represented by G3, command contents or a register address is instructed. In this manner, the detection data from the detection devices 30X, 30Y, and 30Z is continuously read. In other words, the detection data from the detection devices 30X, 30Y, and 30Z is sequentially output as the data output signal SDO.

For example, as illustrated in FIG. 6, the data transmitting orders of the detection devices 30X, 30Y, and 30Z are set as k=1, k=2, and k=3, respectively, and the number of transmission data sets is set as m=8. Hence, in an output period T1, 8-bit detection data, of which m=8, is output from the detection device 30X having the data transmitting order of k=1. In the next output period T2, 8-bit detection data, of which m=8, is output from the detection device 30Y having the data transmitting order of k=2. In the next output period T3, 8-bit detection data, of which m=8, is output from the detection device 30Z having the data transmitting order of k=3.

According to the detailed configurational examples of the embodiment, when the host device designates the common address and issues the read command, the detection devices transmit the detection data in preset data transmitting orders. In addition, the number of bits of transmission data of the detection data to be transmitted is also the preset number of bits. Hence, the host device reads and acquires the detection data transmitted sequentially and continually from the detection devices. In other words, the data transmitting order is stored in the storage unit such as the non-volatile memory, and thereby it is possible to determine, in advance, an order in which the detection devices may output the detection data. The number of connections or the number of bits of transmission data is stored in the storage unit, and thereby it is possible to determine, in advance, how many detection devices are connected to the host device or how many bits of the detection data is output by the detection devices. Hence, since the detection devices may just output the detection data in accordance with the determination, it is possible to simplify the processing or control of the detection device. In addition, since the host device may acquire the detection data from the detection device in accordance with the determination, it is possible to simplify the processing or control of the host device.

In the embodiment, the items of detection data acquired at the common acquisition timing represented by G4 in FIG. 7 are sequentially output from the detection devices 30X, 30Y, and 30Z in the output periods, T1, T2, and T3. In other words, the detection data acquired from the detection circuit 60X at the common acquisition timing of G4 is output from the interface 40X of the detection device 30X in the output period T1. In addition, the detection data acquired from the detection circuit 60Y at the common acquisition timing of G4 is output from the interface 40Y of the detection device 30Y in the output period T2. In addition, the detection data acquired from the detection circuit 60Z at the common acquisition timing of G4 is output from the interface 40Z of the detection device 30Z in the output period T3. As described above, the items of detection data are output from the detection devices 30X, 30Y, and 30Z at the common acquisition timings. Hence, the timing, at which the detection data is acquired, is clearly known, and it is possible to acquire more appropriate information as information identified by the detection data.

As illustrated in FIG. 7, the common acquisition timing represented by G4, which is a timing after a receiving timing of the commands (common destination commands) represented by G1, G2, and G3, is a timing before the output periods T1, T2, and T3 of the detection data from the detection devices 30X, 30Y, and 30Z (at least the one other detection device and the own detection device). The receiving timing of the commands (common destination commands) is a timing at which the command decoder 52 in FIG. 10 to be described below determines that the commands (common destination commands) are received. In other words, the receiving timing is a timing of determining that the common address (for example, 00) with the detection devices 30X, 30Y, and 30Z as the common destinations is designated and the issued read command is received. The detection data is acquired from the detection circuits 60X, 60Y, and 60Z at the timing (G4) before the output periods T1, T2, and T3 after the receiving timing of the commands (common destination commands). The detection devices 30X, 30Y, and 30Z output the acquired detection data in the output periods T1, T2, and T3.

In this manner, the detection devices 30X, 30Y, and 30Z can output the detection data with a smaller time lag. For example, FIG. 7, the time lag is delay time from the acquisition timing and the output period T3 of the detection device 30Z is the longest period; however, the common acquisition timing is the timing represented by G4, and thereby it is possible to optimally shorten the time lag, and it is possible to further shorten the delay time of the detection data.

In addition, in the embodiment, the interface 40X (40Y or 40Z) outputs, in the first mode, the detection data acquired at the common acquisition timing represented by G4 as illustrated in FIG. 7. On the other hand, the interface 40X (40Y or 40Z) outputs, in the second mode, the detection data acquired at a timing before the output period T1 (T2 or T3) of the detection data from the own detection device 30X (30Y or 30Z).

Figure 8:
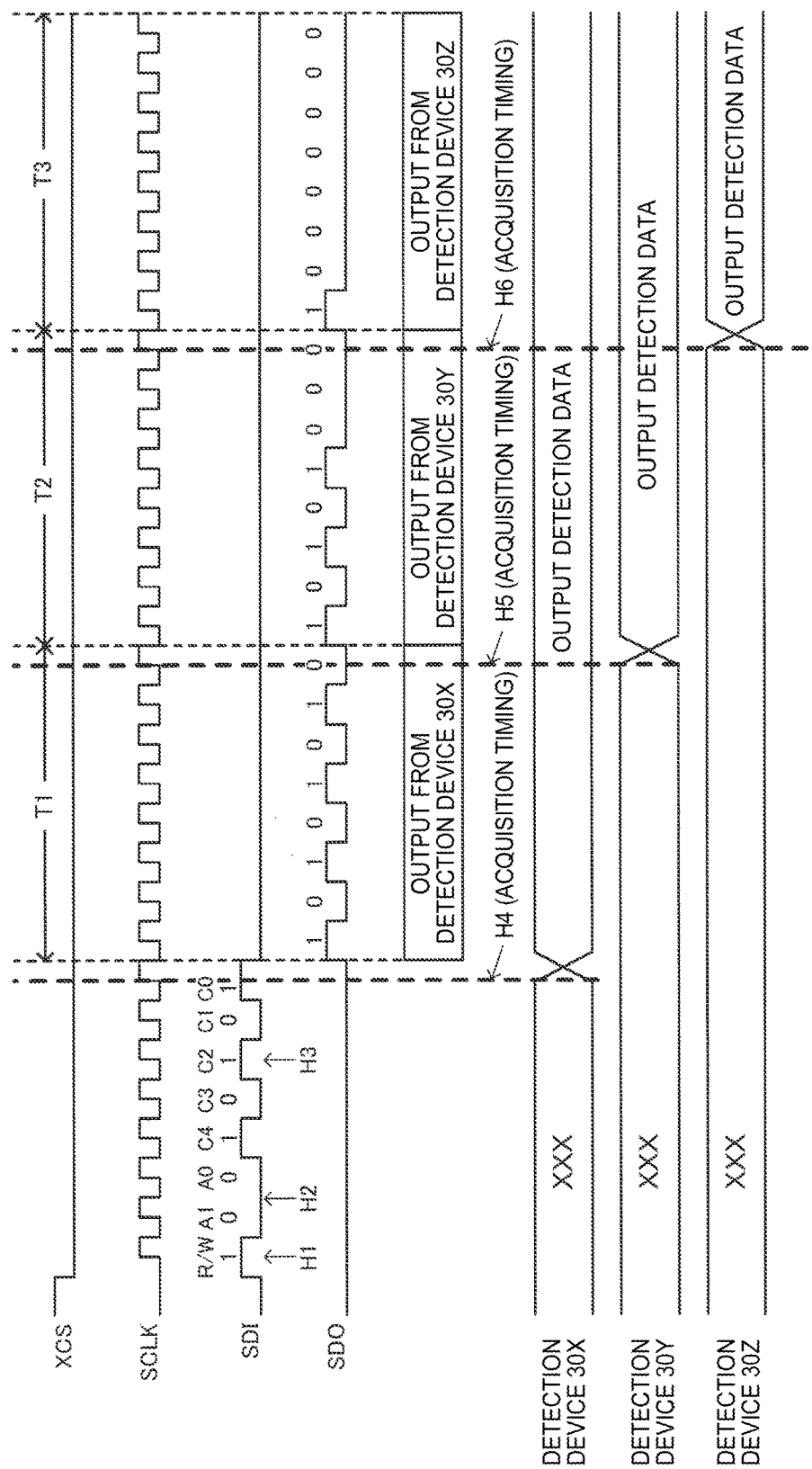
FIG. 8 is another example of the signal waveform illustrating an operation of the detailed configurational examples.

For example, after the commands (common destination commands) as represented by H1, H2, and H3 in FIG. 8 are received in the second mode, the interface 40X (detection device 30X) outputs the data acquired at a timing represented by H4 immediately before the output period T1 of the detection data. In addition, the interface 40Y (detection device 30Y) outputs the data acquired at a timing represented by H5 immediately before the output period T2 of the detection data for example. In addition, the interface 40Z (detection device 30Z) outputs the data acquired at a timing represented by H6 immediately before the output period T3 of the detection data for example.

For example, in a use in which aligning of the acquisition timings of the detection data is considered to be importance, the first mode in FIG. 7 is set. For example, in a use in which the posture information of the detection target (an electronic device such as a camera or a vehicle such as a car) is identified from the detection data of the angular velocity around the X axis, the Y axis, and the Z axis, the device is set to the first mode in FIG. 7 because it is desirable to align the acquisition timings of the detection data of the angular velocity on the coordinate axis.

On the other hand, in a use in which using of the detection data obtained immediately before the output periods T1, T2, and T3 is considered to be importance, the second mode in FIG. 8 is set. The setting of the second mode enables the delay time (time lag) between the acquisition timing and the output timing of the detection data to be shortened to the smallest extent, and it is desirable to set the second mode in a use in which a real time property of the detection data is considered to be important. The first and second modes in FIGS. 7 and 8 are switched by register setting. For example, the host device 10 performs writing to a setting register of the detection device 30X (30Y or 30Z), and thereby an operation mode can be set to the first mode or set to the second mode. In this manner, it is possible to set the operation mode by arbitrarily switching to the first or second mode in FIGS. 7 and 8, depending on the use thereof. It is possible to acquire and output the detection data in state in accordance with the first and second modes. The setting information of the first and second modes may be written in the storage unit 70X (70Y or 70Z) which is realized by the non-volatile memory.

Figure 9:
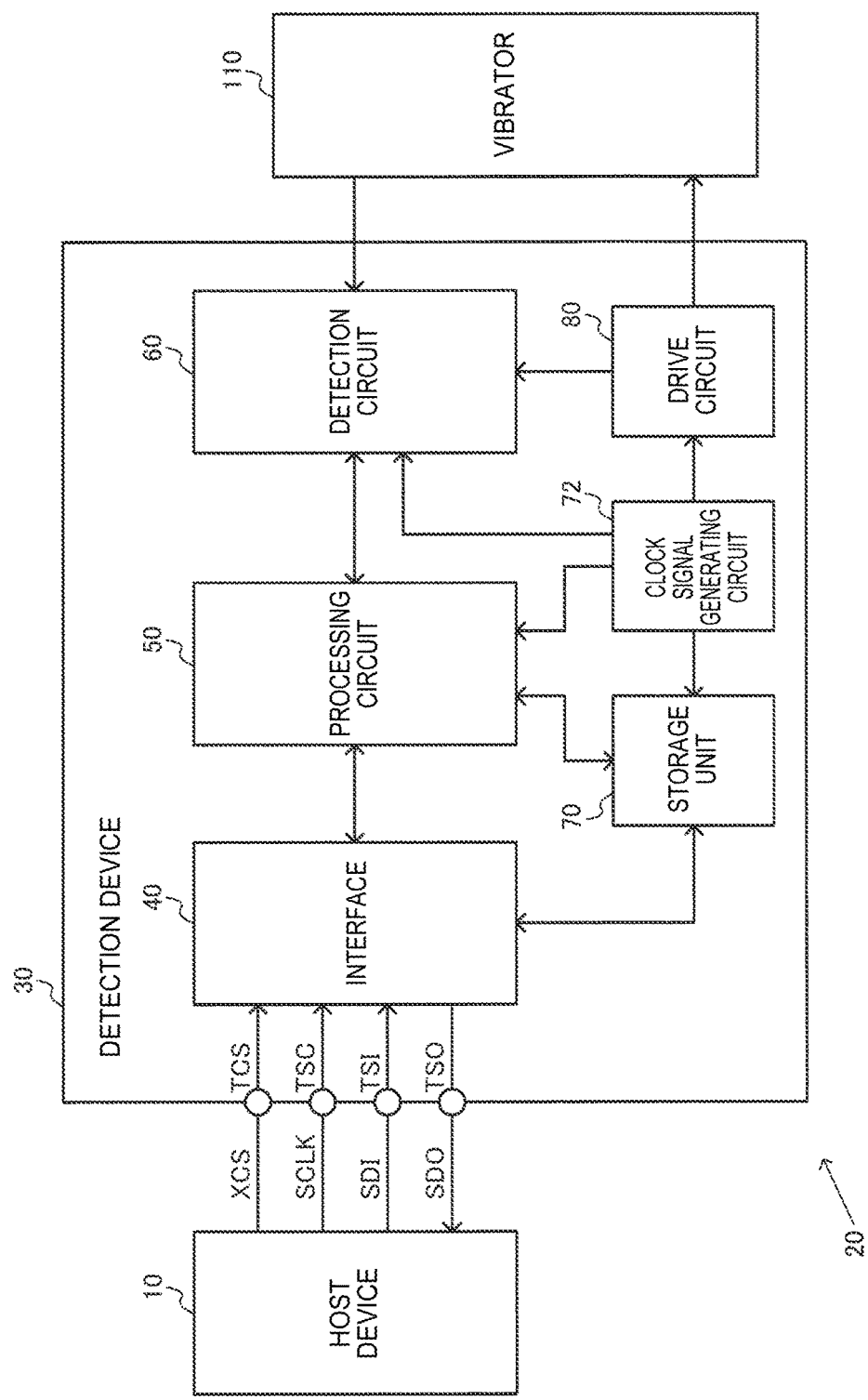
FIG. 9 illustrates more detailed configurational examples of the detection device and the physical quantity measuring device of the embodiment.

FIG. 9 illustrates a detailed configurational example of a detection device 30 (30X, 30Y, or 30Z). In FIG. 9, the detection device 30 includes the interface 40, the processing circuit 50, the detection circuit 60, the storage unit 70, the clock signal generating circuit 72, and a drive circuit 80. The detection device 30 is not limited to the configuration in FIG. 9, and it is possible to achieve various types of embodiments obtained by omitting some of configurational elements, adding another configurational element, or the like.

The processing circuit 50 performs various types of processing/control required for an operation of the detection device 30. The processing circuit 50 can be realized by processors such as a CPU and a MPU or a hardware circuit such as an ASIC, or the like.

The drive circuit 80 receives a feedback signal from the vibrator 110 (the physical quantity transducer in a broad sense) and drives the vibrator 110. For example, the drive circuit 80 outputs a drive signal (drive voltage) and drives the vibrator 110. The drive circuit receives the feedback signal from the vibrator 110 and causes the vibrator 110 to be excited.

The detection circuit 60 performs detection processing of a desired signal based on the signal from the vibrator 110 and outputs the detection data. For example, the detection circuit 60 receives the detection signal (detected current and electric charges) from the vibrator 110 that is driven by the drive circuit 80. The desired signal is detected (extracted) from the detection signal according to a physical quantity applied to the vibrator 110. For example, a desired signal according to the Coriolis force is detected, and thereby the angular velocity data of rotation around a predetermined axis is obtained as the detection data.

The interface 40 receives the chip select signal XCS, the clock signal SCLK, and the data input signal SDI from the host device 10 via terminals TCS, TSC, and TSI. In addition, the data output signal SDO is output via the terminal TSO. For example, the detection device 30 can be realized by the semiconductor IC (semiconductor chip). In this case, the terminals TCS, TSC, TSI, and TSO are pads or the like of the semiconductor IC.

FIG. 10 illustrates detailed configurational examples of the interface 40, the processing circuit 50, and the detection circuit 60 included in the detection device 30.

The interface 40 includes I/O circuits IO1, IO2, IO3, and IO4, a serial/parallel converter 42, and a parallel/serial converter 44. The I/O circuits IO1, IO2, IO3, and IO4 can be configured of an input buffer, an output buffer, or an input/output buffer. The terminals (pads) TCS and TSC are connected to the I/O circuits IO1 and IO2, respectively, and the chip select signal XCS and the clock signal SCLK are input to the I/O circuits IO1 and IO2. The terminal (pad) TSI is connected to the I/O circuits IO3, and the data input signal SDI is input to the I/O circuit IO3. The serial data input signal SDI (serial data) is converted into a parallel signal (parallel data) by the serial/parallel converter 42. On the other hand, the parallel signal from the processing circuit (transmission controller 59) is converted into a serial signal by the parallel/serial converter 44. The I/O circuit IO4 outputs the serial signal as the data output signal SDO to the terminal TSO.

The processing circuit 50 includes the command decoder 52, the output data controller 53, a comparison/determination unit 54, registers 56, 57, and 58, and the transmission controller 59.

The command decoder 52 receives the parallel signal from the serial/parallel converter 42 and performs a command decoding process. In other words, the command decoder interprets a command input by the data input signal SDI. The command decoder selects the registers 56, 57, and 58 as setting targets and performs various types of register setting.

The comparison/determination unit 54 (slave selecting register) compares a slave address stored in the storage unit 70 (non-volatile memory) with an address designated by the host device 10 by using the data input signal SDI and determines whether the writing or the reading of data is performed to the registers 56, 57, and 58. For example, the storage unit 70 stores the individual address as the slave address. In a case where the address designated by the host device 10 by using the data input signal SDI matches the own individual address (slave address), writing to the registers 56, 57, and 58 is performed.

The register 56 is a register that performs various types of setting of the digital signal processing circuit 62 (DSP) or the transmission controller 59. The digital signal processing circuit 62 can perform digital filtering process such as a filtering process of removing an unnecessary signal of the detection data or the filtering process of band limitation. In the register 56, setting of frequency characteristics such as a cut-off frequency or the like of the digital filter.

The register 57 is a register that performs the various types of setting by the A/D conversion circuit 64, and the register 58 is a register that performs the various types of setting of the analog circuit 66.

The analog circuit 66 is various types of analog circuits (an amplification circuit, a gain control circuit, synchronized detected circuit or the like) which include the detection circuit 60, the drive circuit 80, and the like. The A/D conversion circuit 64 converts a desired analog signal detected by the analog circuit 66 into digital detection data.

The digital signal processing circuit 62 performs various types of digital filtering processes on the digital detection data from the A/D conversion circuit 64 and outputs the detection data after the digital filtering process. The transmission controller 59 receives the detection data from the digital signal processing circuit 62 and performs transmission control of the detection data, based on the setting information stored in the register 56 and the information stored in the storage unit 70.

For example, the common address is designated by the host device 10 and the read command is issued. The transmission controller 59 performs the control of transmitting the detection data in the own data transmitting order. In this case, the data transmitting order, the number of beats of the transmission data, or the like is determined, based on the information read from the storage unit 70.

The output data controller 53 in FIG. 10 acquires the detection data at the common acquisition timing among the detection data updated by the detection circuit 60 and performs control of outputting data to the interface 40.

In other words, the clock signal generating circuit in FIG. 10 generates a clock signal by using the internally-provided oscillation circuit such as the CR oscillation circuit. Otherwise, the clock signal generating circuit 72 generates a clock signal by using the oscillating signal due to the excitation of the vibrator 110 in FIG. 9. The detection circuit 60 operates in response to the operation clock signal, based on the generated clock signal. In this manner, the detection data of the detection circuit 60 is updated with the operation clock signal as reference. In addition, the processing circuit 50 also operates in response to the operation clock signal, based on the generated clock signal.

As illustrated in FIG. 10, the processing circuit 50 includes the command decoder 52, and the command decoder 52 interprets and determines the command that is input as illustrated by G1, G2, and G3 in FIG. 7 by the data input signal SDI. For example, whether the command is the read command or is the write command is determined by the R/W represented by G1 in FIG. 7, and whether the address is the common address or the individual address is determined by A [1:0] represented by G2. When determining that the read command obtained by designating the common address is received, the command decoder 52 outputs an acquisition instructing signal of the detection data to the output data controller 53. The output data controller 53 determines the detection data at a timing instructed by the acquisition instructing signal as the output detection data, of the detection data that is updated in the detection circuit 60. The determined output detection data is output to the interface 40 (parallel/serial converter) via the transmission controller 59, and is output to the interface 40 as the detection data at the common acquisition timing.

In this manner, it is possible to appropriately output, to the interface 40, the detection data acquired at the common acquisition timing among the detection data updated by the detection circuit 60.

As represented by G4 in FIG. 7, the common acquisition timing, which is a timing after a receiving timing of the commands (common destination commands), is a timing before the output periods T1, T2, and T3 of the detection data; however, the receiving timing of the commands (common destination commands) in this case is a timing at which the command decoder 52 determines that the command is received. Specifically, the receiving timing of the commands (common destination commands) is a timing at which the read command obtained by designating the common address is determined to be received from the host device 10. In this manner, from the timing at which the command decoder 52 determines that the read command obtained by designating the common address is received, it is possible to perform acquisition process of the detection data from the detection circuit 60.

3. Electronic Device, Vehicle

Figure 11:
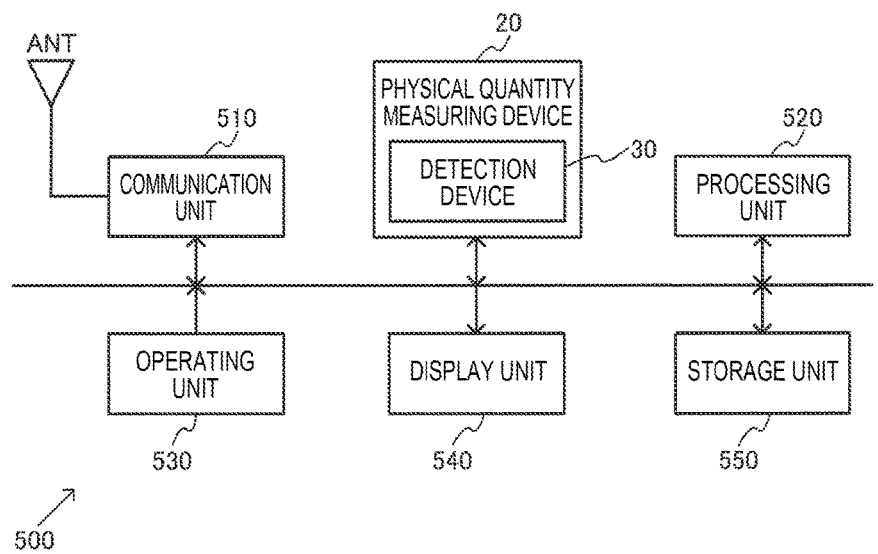
FIG. 11 illustrates a configurational example of an electronic device.

FIG. 11 illustrates a configurational example of an electronic device 500 of the embodiment. The electronic device 500 includes the detection device 30 or the physical quantity measuring device 20 of the embodiment. In addition, the electronic device 500 can include a communication unit 510, a processing unit 520, an operating unit 530, a display unit 540, a storage unit 550, and an antenna ANT. The physical quantity measuring device 20 includes the detection device 30 and the vibrator 110 (the physical quantity transducer) as illustrated in FIG. 9. The processing unit 520 corresponds to the host device 10 in FIG. 9. The electronic device 500 is not limited to the configuration in FIG. 11, and it is possible to achieve various types of embodiments obtained by omitting some of configurational elements, adding another configurational element, or the like.

Examples of the electronic device 500 include a video device such as a digital camera or a video camera, an in-vehicle device (self-driving device or the like), a wearable device such as a head mounted type display device or a timepiece associated device, a printing device, a robot, a portable information terminal (a smartphone, a mobile phone, a portable game device, a lap-top PC, tablet PC, or the like), or various types of devices such as a projecting device.

The communication unit 510 (wireless circuit) receives data from the outside via the antenna ANT or performs a process of transmitting the data to the outside. The processing unit 520 performs control processing of the electronic device 500, various types of digital processing of the data transmitted and received via the communication unit 510. In addition, the processing unit 520 performs various types of processing by using the physical quantity information measured by the physical quantity measuring device 20. For example, the function of the processing unit 520 can be realized by a processor such as a microcomputer. The operating unit 530 is used for a user who performs an input operation, and can be realized of an operating button, a touch panel display, or the like. The display unit 540 displays various types of information, and can realize a display such as a liquid crystal or an organic EL. The storage unit 550 stores data and the function thereof can be realized by a semiconductor memory such as a RAM or a ROM or a hard disk driver (HDD).

Figure 12:
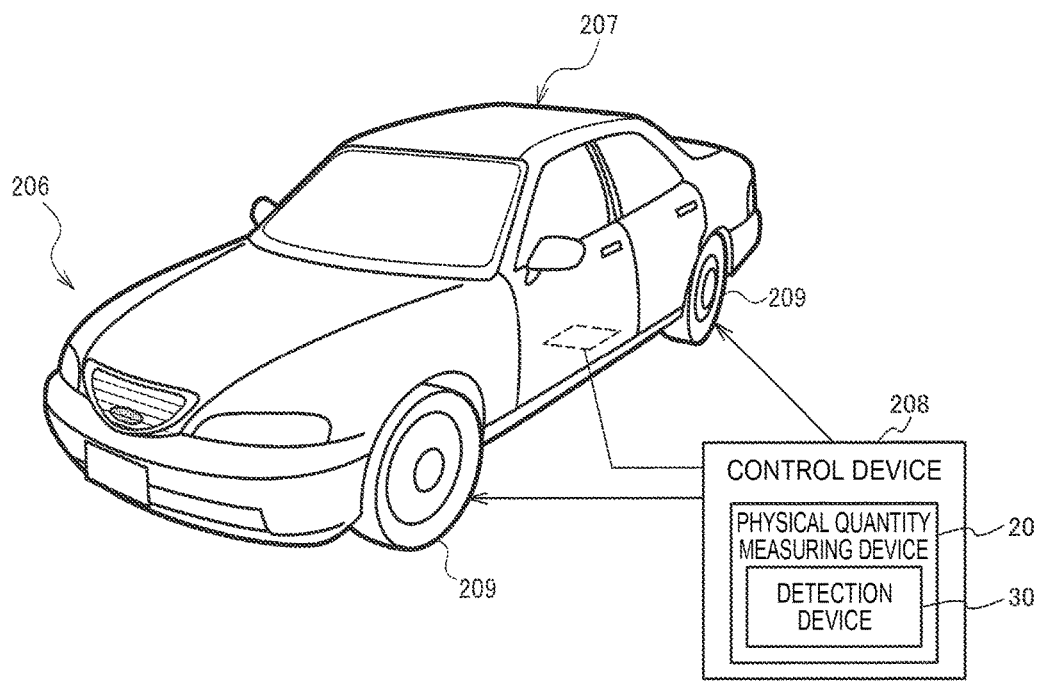
FIG. 12 illustrates an example of a vehicle.

FIG. 12 illustrates an embodiment of a vehicle that includes the detection device 30 or the physical quantity measuring device 20 of the embodiment. For example, the detection device 30 or the physical quantity measuring device 20 of the embodiment can be incorporated in various types of vehicles such as a car, an airplane, a bike, a bicycle, a robot, or a ship. For example, the vehicle includes a drive mechanism such as an engine or a motor, a steering mechanism of a steering wheel or a rudder, and various electronic devices (in-vehicle devices), and the vehicle is a device that moves on the ground, in the sky, and in the sea. FIG. 12 schematically illustrates an automobile 206 as a specific example of the vehicle. The physical quantity measuring device 20 including the detection device 30 and physical quantity transducer (not illustrated) of the embodiment is incorporated in the automobile 206 (vehicle). The control device 208 performs various types of control processes, based on the physical quantity information measured by the physical quantity measuring device 20. For example, the physical quantity measuring device 20 (a gyro sensor or a compound sensor) can detect posture of a vehicle body 207. The detection signal of the physical quantity measuring device 20 is supplied to a control device 208 of the vehicle body posture. For example, the control device 208 controls hardness of the suspension depending on the posture of the vehicle body 207 or controls brakes of individual wheels 209. Otherwise, such posture control can be used in the various types of vehicles such as a biped walking robot, an aircraft, a helicopter. A device, in which the detection device 30 and the physical quantity measuring device 20 of the embodiment are incorporated, is not limited to the control device 208, and it is possible to perform incorporation in a various types of devices (in-vehicle devices) which are provided in the vehicle such as the automobile 206.

As described above, the embodiments are described in detail; however, it is possible for those skilled in the art to easily understand that significant modifications can be performed without practically departing from novel features and effects of the invention. Hence, such modification examples are included in the scope of the invention. For example, in the specification or the figures, the terms (the host device, the vibrator, and the like) described as the different terms (the external device, the physical quantity transducer, and the like) in a broader or equivalent sense at least once can also be replaced with the different terms at any position in the specification or figures. In addition, a combination of all the embodiments and the modification examples is also included in the scope of the invention. In addition, the configurations and operations of the detection device, the physical quantity measuring device, the detection system, the electronic device, and the vehicle or the configurations and operations of the detection circuit, the interface, and the processing circuit are not limited to the description of the embodiments, and various types of modification can be performed.

The entire disclosure of Japanese Patent Application No. 2017-060780, filed Mar. 27, 2017 is expressly incorporated by reference herein.

What is claimed is:

1. A detection device comprising:
a detection circuit configured to perform detection processing based on a signal from a physical quantity transducer and output detection data with respect to the detection device and another detection device that is separately disposed from the detection device;
an interface configured to connect with an external device and output the detection data to the external device; and
a processing circuit,
wherein the processing circuit outputs the detection data acquired from the detection circuit at a common acquisition timing common to the another detection device and the detection device to the interface in a data transmitting order of the detection device when the processing circuit receives, from the external device, a common destination command with the another detection device and the detection device as common destinations, and
the common acquisition timing is a timing after a receiving timing of the common destination command and is a timing before an output period of the detection data from the another detection device and the detection device.

2. The detection device according to claim 1,
wherein the processing circuit includes a command decoder, and
wherein the receiving timing of the common destination command is a timing at which the command decoder determines that the common destination command is received.

3. The detection device according to claim 1,
wherein the common destination command is a read command which is issued by the external device by designating a common address for the another other detection device and the detection device as the common destinations.

4. The detection device according to claim 1,
wherein the another detection device and the detection device detect the detection data on a first physical quantity and acquire the detection data on the first physical quantity at the common acquisition timing.

5. The detection device according to claim 4,
wherein the detection data on the first physical quantity corresponds to angular velocity around a first axis or acceleration in a first axial direction.

6. The detection device according to claim 1,
wherein the another detection device and the detection device detect the detection data on different physical quantities from each other and acquire the detection data on the different physical quantities at the common acquisition timing.

7. The detection device according to claim 1,
wherein the interface is configured to:
output, in a first mode, the detection data acquired at the common acquisition timing, and
output, in a second mode, the detection data acquired at a timing before the output period of the detection data from the detection device.

8. The detection device according to claim 1, further comprising:
a storage configured to store information of the data transmitting order of the detection device,
wherein the interface transmits the detection data to the external device in the data transmitting order stored in the storage.

9. The detection device according to claim 1,
wherein the processing circuit includes an output data controller that is configured to acquire the detection data at the common acquisition timing among the detection data updated by the detection circuit and output the acquired detection data to the interface.

10. The detection device according to claim 1,
wherein the physical quantity transducer is a vibrator, and
wherein the detection circuit is configured to detect angular velocity around a predetermined axis.

11. A physical quantity measuring device comprising:
the detection device according to claim 1; and
the physical quantity transducer.

12. A detection system comprising:
the detection device according to claim 1; and
the external device.

13. An electronic device comprising:
the detection device according to claim 1.

14. A vehicle comprising:
the detection device according to claim 1.

15. A detection device comprising:
a detection circuit configured to perform detection processing based on a signal from a physical quantity transducer and output detection data with respect to the detection device and another detection device that is separately disposed from the detection device;
an interface configured to connect with an external device and output the detection data to the external device; and
a processing circuit,
wherein the processing circuit outputs the detection data acquired from the detection circuit at a common acquisition timing common to the another detection device and the detection device to the interface in a data transmitting order of the detection device when the processing circuit receives, from the external device, a common destination command with the another detection device and the detection device as common destinations, and
wherein the common destination command is a read command which is issued by the external device by designating a common address for the another detection device and the detection device as the common destinations.

16. A detection device comprising:
a detection circuit configured to perform detection processing based on a signal from a physical quantity transducer and output detection data with respect to the detection device and another detection device that is separately disposed from the detection device;
an interface configured to connect with an external device and output the detection data to the external device; and
a processing circuit,
wherein the processing circuit outputs the detection data acquired from the detection circuit at a common acquisition timing common to the another detection device and the detection device to the interface in a data transmitting order of the detection device, and
wherein the interface configured to:
output, in a first mode, the detection data acquired at the common acquisition timing; and
output, in a second mode, the detection data acquired at a timing before the output period of the detection data from the detection device.

17. A physical quantity measuring device comprising:
the detection device according to claim 16; and
the physical quantity transducer.

18. A detection system comprising:
the detection device according to claim 16; and
the external device.

19. An electronic device comprising:
the detection device according to claim 16.

20. A vehicle comprising:
the detection device according to claim 16.

* * * * *